United States Patent
Miyake et al.

(10) Patent No.: US 9,733,524 B2
(45) Date of Patent: Aug. 15, 2017

(54) LIQUID CRYSTAL DISPLAY DEVICE AND MANUFACTURING METHOD THEREFOR

(71) Applicant: Sharp Kabushiki Kaisha, Osaka-shi, Osaka (JP)

(72) Inventors: Isamu Miyake, Osaka (JP); Koichi Miyachi, Osaka (JP); Hiroaki Asagi, Osaka (JP); Akira Hirai, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 407 days.

(21) Appl. No.: 14/374,980

(22) PCT Filed: Jan. 28, 2013

(86) PCT No.: PCT/JP2013/051756
§ 371 (c)(1),
(2) Date: Jul. 28, 2014

(87) PCT Pub. No.: WO2013/115130
PCT Pub. Date: Aug. 8, 2013

(65) Prior Publication Data
US 2015/0002799 A1 Jan. 1, 2015

(30) Foreign Application Priority Data
Jan. 30, 2012 (JP) .................................. 2012-016144

(51) Int. Cl.
*G02F 1/1337* (2006.01)
*G02F 1/1339* (2006.01)
*G02F 1/1333* (2006.01)

(52) U.S. Cl.
CPC .... *G02F 1/133788* (2013.01); *G02F 1/13394* (2013.01); *G02F 1/133711* (2013.01);
(Continued)

(58) Field of Classification Search
CPC ......... G02F 1/133711; G02F 1/133788; G02F 1/13394;
(Continued)

(56) References Cited

U.S. PATENT DOCUMENTS 6,977,704 B2 12/2005 Kataoka
7,169,449 B2 1/2007 Nakanishi et al.
(Continued)

FOREIGN PATENT DOCUMENTS

JP 2002-357830 A 12/2002
JP 2003-307720 A 10/2003
(Continued)

OTHER PUBLICATIONS

Official Communication issued in International Patent Application No. PCT/JP2013/051756, mailed on Apr. 16, 2013.

*Primary Examiner* — Sophie Hon
(74) *Attorney, Agent, or Firm* — Keating & Bennett, LLP

(57) ABSTRACT

A liquid crystal display device (100) includes a first substrate (10) and a second substrate (20) opposing each other, and a liquid crystal layer (30) provided between the first substrate and the second substrate. At least one of the first substrate and the second substrate includes a horizontal alignment film (12, 22) provided on a side closer to the liquid crystal layer. The liquid crystal display device further includes an alignment sustaining layer (40a, 40b) provided between the horizontal alignment film and the liquid crystal layer, the alignment sustaining layer containing a polymerization product of a photopolymerizable compound. The photopolymerizable compound contains an acrylate group or a methacrylate group. The polymerization product in the alignment sustaining layer contains an acrylate group or a methacrylate group as a residue. The horizontal alignment film contains an acrylate group or a methacrylate group.

11 Claims, 7 Drawing Sheets

(52) U.S. Cl.
CPC .............. *G02F 2001/13398* (2013.01); *G02F 2001/133397* (2013.01); *Y10T 428/1005* (2015.01)

(58) Field of Classification Search
CPC .......... G02F 2001/133397–2001/13398; Y10T 428/1005
See application file for complete search history.

(56) References Cited

U.S. PATENT DOCUMENTS

| | | | |
|---|---|---|---|
| 7,843,531 | B2 | 11/2010 | Nakanishi et al. |
| 2003/0231272 | A1* | 12/2003 | Nakamura ........ G02F 1/133703 349/123 |
| 2004/0191428 | A1 | 9/2004 | Tsuda et al. |
| 2007/0064176 | A1 | 3/2007 | Kubota et al. |
| 2009/0046221 | A1* | 2/2009 | Miyachi ................ C09K 19/18 349/69 |
| 2009/0269515 | A1 | 10/2009 | Kataoka |
| 2010/0026662 | A1* | 2/2010 | Oohira ................ G02F 1/13338 345/174 |
| 2010/0134739 | A1 | 6/2010 | Kubota et al. |
| 2011/0102720 | A1 | 5/2011 | Mizusaki et al. |
| 2011/0164213 | A1 | 7/2011 | Nakanishi et al. |
| 2011/0199566 | A1 | 8/2011 | Mazusaki et al. |
| 2011/0234955 | A1 | 9/2011 | Mizusaki et al. |
| 2011/0310319 | A1* | 12/2011 | Mizusaki ............. G02B 5/3083 349/33 |
| 2011/0310339 | A1 | 12/2011 | Itoh |
| 2012/0092603 | A1 | 4/2012 | Mizusaki et al. |

FOREIGN PATENT DOCUMENTS

| | | | | |
|---|---|---|---|---|
| JP | | 2004-294605 A | 10/2004 | |
| JP | | 2006-078968 A | 3/2006 | |
| JP | | 2007-057817 A | 3/2007 | |
| JP | | 2007-108720 A | 4/2007 | |
| JP | | 2009-265308 A | 11/2009 | |
| JP | WO | 2010131392 A1 * | 11/2010 | ........... G02B 5/3083 |
| JP | | 2011-043726 A | 3/2011 | |
| WO | | 2010/098063 A1 | 9/2010 | |
| WO | | 2010/131392 A1 | 11/2010 | |
| WO | | 2011/001579 A1 | 1/2011 | |

\* cited by examiner (a)

200nm (b)

200nm (c)

200nm

LIQUID CRYSTAL DISPLAY DEVICE AND MANUFACTURING METHOD THEREFOR

TECHNICAL FIELD

The present invention relates to a liquid crystal display device, and more particularly to a liquid crystal display device having an alignment sustaining layer. Moreover, the present invention relates to a method of producing such a liquid crystal display device.

BACKGROUND ART

A liquid crystal display device includes a pair of substrates and a liquid crystal layer interposed therebetween, and performs displaying by utilizing changes in the alignment direction of liquid crystal molecules based on a voltage which is applied across the liquid crystal layer. Conventionally, the alignment direction (pretilt direction) of liquid crystal molecules while no voltage is applied across the liquid crystal layer is regulated by an alignment film. For example, in a TN-mode liquid crystal display device, pretilt azimuths of liquid crystal molecules are regulated by performing a rubbing treatment for a horizontal alignment film. As used herein, a pretilt azimuth refers to components within the liquid crystal layer plane (within the substrate plane) of a vector which indicates an alignment direction of a liquid crystal molecule in a liquid crystal layer across which no voltage is applied. Note that a pretilt angle, i.e., an angle between an alignment film and a liquid crystal molecule, is primarily determined by the combination of an alignment film and a liquid crystal material. A pretilt direction is expressed in terms of a pretilt azimuth and a pretilt angle.

As a technique for controlling the pretilt direction of liquid crystal molecules, Polymer Sustained Alignment Technology (hereinafter referred to as the "PSA technique") was developed in the recent years (see Patent Documents 1, 2, and 3). The PSA technique is a technique where a liquid crystal material having a small amount of photopolymerizable compound (which typically is a photopolymerizable monomer) mixed therein is sealed in a liquid crystal panel, and thereafter the photopolymerizable compound is irradiated with light (e.g., ultraviolet) while a predetermined voltage is applied across the liquid crystal layer, so that the generated polymerization product will control the pretilt direction of the liquid crystal molecules. A layer which is formed of the aforementioned polymerization product will be referred to as an alignment sustaining layer in the present specification.

Adopting the PSA technique allows an alignment state of liquid crystal molecules when generating the polymerization product to be maintained (memorized) even after the voltage is removed (i.e., in the absence of an applied voltage). Therefore, the PSA technique has an advantage in that the pretilt azimuths and pretilt angles of liquid crystal molecules can be adjusted by controlling an electric field which is created across the liquid crystal layer, etc. Moreover, since the PSA technique does not require a rubbing treatment, it is particularly suitable for producing a vertical-alignment type liquid crystal layer, whose pretilt direction is difficult to be controlled through a rubbing treatment. Therefore, the PSA technique has so far been vigorously studied for realizing practical applications in combination with vertical alignment films.

However, an alignment sustaining layer (which is a polymerization product of a photopolymerizable compound) used in the PSA technique may be combined with horizontal alignment films. In recent years, horizontal alignment films are used not only in the aforementioned TN-mode liquid crystal display devices, but also in the liquid crystal display devices of lateral electric field modes, e.g., the IPS (In-Plane Switching) mode and the FFS (Fringe Field Switching) mode. By forming an alignment sustaining layer on a horizontal alignment film, an improved alignment regulating force is obtained, and image sticking can be prevented. When forming an alignment sustaining layer on a horizontal alignment film of a liquid crystal display device of a lateral electric field mode, an alignment treatment such as rubbing or light irradiation needs to be performed for the horizontal alignment film in advance. On the other hand, there is no need to apply a voltage across the liquid crystal layer in the step of forming the alignment sustaining layer because, in a lateral electric field mode, the alignment direction of liquid crystal molecules will change within a plane which is parallel to the substrate plane, so that the pretilt angle may almost be zero.

With reference to FIG. 5 and FIG. 6, the effect of image sticking prevention with alignment sustaining layers is described. FIG. 5($a$) and FIG. 6($a$) are diagrams showing cross-sectional structures of liquid crystal display devices 900A and 900B of the IPS mode (where the electrode structures are omitted). The liquid crystal display devices 900A and 900B each includes a first substrate 910 and a second substrate 920, and a liquid crystal layer 930 interposed therebetween. Moreover, the first substrate 910 and the second substrate 920 of the liquid crystal display devices 900A and 900B have horizontal alignment films 912 and 922 which are provided on the liquid crystal layer 930 side.

However, the liquid crystal display device 900B shown in FIG. 6($a$) further includes alignment sustaining layers 940$a$ and 940$b$ between the horizontal alignment films 912 and 922 and the liquid crystal layer 930, whereas the liquid crystal display device 900A shown in FIG. 5($a$) includes no such alignment sustaining layers.

FIG. 5($b$) and FIG. 6($b$) are photographs showing results of conducting an evaluation test concerning the anti-image sticking property of the liquid crystal display devices 900A and 900B shown in FIG. 5($a$) and FIG. 6($a$). In the evaluation test, first, the display region of each of the liquid crystal display devices 900A and 900B was divided into two regions R1 and R2, and a white voltage (specifically, 6 V) was applied across the liquid crystal layer 930 for a predetermined time (specifically, 6 to 24 hours) in the one region R1 while no such voltage application was performed in the other region R2. FIG. 5($b$) and FIG. 6($b$) show states where a gray scale voltage for presenting an about 1% luminance (i.e., a voltage corresponding to the $32^{nd}$ gray scale level when displaying in 256 gray scale levels) of the luminance under a white voltage is applied across the liquid crystal layer 930 in both regions R1 and R2 thereafter.

In the liquid crystal display device 900A having no alignment sustaining layers formed therein, the luminance in the region R1, which received white voltage application, has a higher luminance than does the region R2, which did not receive white voltage application; thus, image sticking has occurred. On the other hand, in the liquid crystal display device 900B having the alignment sustaining layers 940$a$ and 940$b$ formed therein, the luminance in the region R1, which received white voltage application, is essentially equal to that in the region R2, which did not receive white voltage application; thus, image sticking is prevented.

CITATION LIST

Patent Literature

[Patent Document 1] Japanese Laid-Open Patent Publication No. 2002-357830
[Patent Document 2] Japanese Laid-Open Patent Publication No. 2003-307720
[Patent Document 3] Japanese Laid-Open Patent Publication No. 2006-78968
[Patent Document 4] International Publication No. 2011/001579

SUMMARY OF INVENTION

Technical Problem

However, although forming alignment sustaining layers on the horizontal alignment films prevents image sticking, it has been found to induce a new problem of light spots occurring in large amounts, as shown in FIG. 7. These light spots are ascribable to foreign matter that is floating in the liquid crystal layer, and moves as the liquid crystal panel is pressed. Therefore, when such light spots (called "floating light spots") occur, the display quality is greatly degraded.

Through a detailed study, the inventors have found that the cause for the floating light spots is scum from the alignment sustaining layer that occurs when columnar spacers cause the alignment sustaining layer to peel.

FIG. 8 schematically shows the principle by which floating light spots occur. As shown in FIG. 8, the second substrate 920 of the liquid crystal display device 900B includes a columnar spacer 924 that defines the thickness (cell gap) of the liquid crystal layer 930. The production of the liquid crystal display device 900B includes various steps during which the columnar spacer 924 is vibrated in the lateral direction, for example: a step of mechanically polishing a glass substrate, a step of attaching a polarizer on a liquid crystal panel, a step of transporting a liquid crystal panel, and so on.

At these steps, the columnar spacer 924 vibrates in the lateral direction to cause peeling of the alignment sustaining layer 940a which is provided on the horizontal alignment film 912 of the first substrate 910. This allows scum to occur from the alignment sustaining layer 940a, which then drifts in the liquid crystal layer 930 to give rise to floating light spots. Although the region in which the horizontal alignment film 912 is exposed after the alignment sustaining layer 940a has peeled may also become a light spot, this light spot is a stationary light spot which does not move in response to any pressing on the liquid crystal panel. Since the region in which the columnar spacer 924 is formed is generally shaded, it does not affect the display quality very much.

FIG. 9 shows an SEM image of a portion at which peeling of the alignment sustaining layer 940a has actually occurred in the liquid crystal display device 900B. As shown in FIG. 9, scum 940 as from the alignment sustaining layer 940a has occurred due to peeling of the alignment sustaining layer 940a. Moreover, the horizontal alignment film 912 is exposed in the region where the alignment sustaining layer 940a has peeled.

As described above, when an alignment sustaining layer is formed on a horizontal alignment film, a degradation in display quality due to peeling of the alignment sustaining layer occurs.

Note that Patent Document 4 discloses a technique of further reducing image sticking in a liquid crystal display device having an alignment sustaining layer formed on a vertical alignment film. According to the technique of Patent Document 4, a functional group (polymerization initiating functional group) which serves as a polymerization initiator for a photopolymerizable monomer which is the material of the alignment sustaining layer is contained in the vertical alignment film, thereby making possible a further reduction of image sticking. Moreover, according to this technique, a covalent bond is formed between the polymerization initiating functional group contained in the vertical alignment film and the alignment sustaining layer.

It would seem that peeling of the alignment sustaining layer might be suppressed by applying the technique of Patent Document 4 to a liquid crystal display device having an alignment sustaining layer formed on a horizontal alignment film. However, for reasons described later, it is not possible to sufficiently suppress peeling of an alignment sustaining layer that is formed on a horizontal alignment film. Moreover, when an alignment sustaining layer is formed on a horizontal alignment film, polymerization is accomplished even by an energy which is considerably lower than that for forming an alignment sustaining layer on a vertical alignment film, and thus there is no need for a polymerization initiator in the first place. Moreover, a polymerization initiating functional group being present in the alignment film would deteriorate the alignment property of the liquid crystal molecules, thus lowering the contrast ratio.

The present invention has been made in view of the above problems, and an objective thereof is to provide a liquid crystal display device in which peeling of an alignment sustaining layer formed on a horizontal alignment film is suppressed, as well as a method of producing the same.

Solution to Problem

A liquid crystal display device according to an embodiment of the present invention is a liquid crystal display device comprising: a first substrate and a second substrate opposing each other; and a liquid crystal layer provided between the first substrate and the second substrate, at least one of the first substrate and the second substrate including a horizontal alignment film provided on a side closer to the liquid crystal layer, the liquid crystal display device further comprising an alignment sustaining layer provided between the horizontal alignment film and the liquid crystal layer, the alignment sustaining layer containing a polymerization product of a photopolymerizable compound, wherein, the photopolymerizable compound contains an acrylate group or a methacrylate group; the polymerization product in the alignment sustaining layer contains an acrylate group or a methacrylate group as a residue; and the horizontal alignment film contains an acrylate group or a methacrylate group.

In one embodiment, the horizontal alignment film contains a polymer contributory to horizontal alignment property, the polymer contributory to horizontal alignment property containing an acrylate group or a methacrylate group.

In one embodiment, the horizontal alignment film contains a polymer contributory to horizontal alignment property, and an oligomer or polymer which is formed through polymerization of a polyfunctional acrylate monomer or a polyfunctional methacrylate monomer, the oligomer or polymer containing an acrylate group or a methacrylate group as a residue.

In one embodiment, the acrylate group or methacrylate group contained in the polymerization product in the alignment sustaining layer is bonded to the acrylate group or methacrylate group contained in the horizontal alignment film.

In one embodiment, the photopolymerizable compound is polyfunctional.

In one embodiment, the second substrate includes a columnar spacer that defines thickness of the liquid crystal layer; and between the first substrate and the second substrate, at least the first substrate includes the horizontal alignment film.

In one embodiment, the first substrate has a recess near a region abutting the columnar spacer.

In one embodiment, the horizontal alignment film has a thickness of 50 nm or less in the region of the first substrate abutting the columnar spacer.

In one embodiment, the first substrate and the second substrate each includes an insulative transparent substrate; and a total of thicknesses of the transparent substrates in the first substrate and the second substrate is 1 mm or less.

In one embodiment, the liquid crystal display device according to an embodiment of the present invention functions as a touch screen panel.

In one embodiment, the horizontal alignment film is a photoalignment film.

In one embodiment, the liquid crystal layer contains liquid crystal molecules containing an alkenyl group.

In one embodiment, a remaining amount of the photopolymerizable compound in the liquid crystal layer is 30% or less.

A method of producing a liquid crystal display device according to an embodiment of the present invention comprises: a step of providing a first substrate and a second substrate, at least one of which includes a horizontal alignment film; a step of producing a liquid crystal panel having a liquid crystal material sealed in between the first substrate and the second substrate, the liquid crystal material having a photopolymerizable compound mixed therein; and a step of forming an alignment sustaining layer on the horizontal alignment film by irradiating the liquid crystal panel with light to polymerize the photopolymerizable compound, wherein, the photopolymerizable compound contains an acrylate group or a methacrylate group; and the horizontal alignment film contains an acrylate group or a methacrylate group.

In one embodiment, the step of providing the first substrate and the second substrate comprises a step of providing an alignment film material for composing the horizontal alignment film; and the alignment film material contains a polymer contributory to horizontal alignment property or a precursor thereof, the polymer or a precursor thereof containing an acrylate group or a methacrylate group.

In one embodiment, the step of providing the first substrate and the second substrate comprises a step of providing an alignment film material for composing the horizontal alignment film; and the alignment film material contains a polymer contributory to horizontal alignment property or a precursor thereof, and a polyfunctional acrylate monomer or a polyfunctional methacrylate monomer.

In one embodiment, the photopolymerizable compound is polyfunctional.

In one embodiment, in the step of forming the alignment sustaining layer, light irradiation is performed without applying a voltage in the liquid crystal panel.

In one embodiment, the step of forming the alignment sustaining layer is carried out so that a remaining amount of the photopolymerizable compound in the liquid crystal material is 30% or less.

Advantageous Effects of Invention

According to an embodiment of the present invention, there is provided a liquid crystal display device in which peeling of an alignment sustaining layer formed on a horizontal alignment film is suppressed, as well as a method of producing the same.

DESCRIPTION OF EMBODIMENTS

The problem of peeling of an alignment sustaining layer as already described above is specific to the case where the alignment sustaining layer is formed on a horizontal alignment film, and this problem does not occur in the case where the alignment sustaining layer is formed on a vertical alignment film. The reasons thereof as have been ascertained by the inventors will be described.

Figure 10:
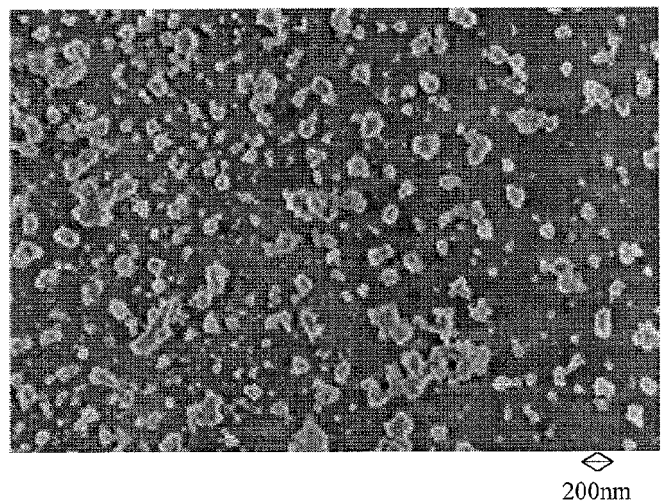
FIG. 10(a) is an SEM image of a vertical alignment film surface after an alignment sustaining layer is formed; (b) is an SEM image of a horizontal alignment film surface before an alignment sustaining layer is formed; and (c) is an SEM image of a horizontal alignment film surface after an alignment sustaining layer is formed.
Figure 10:
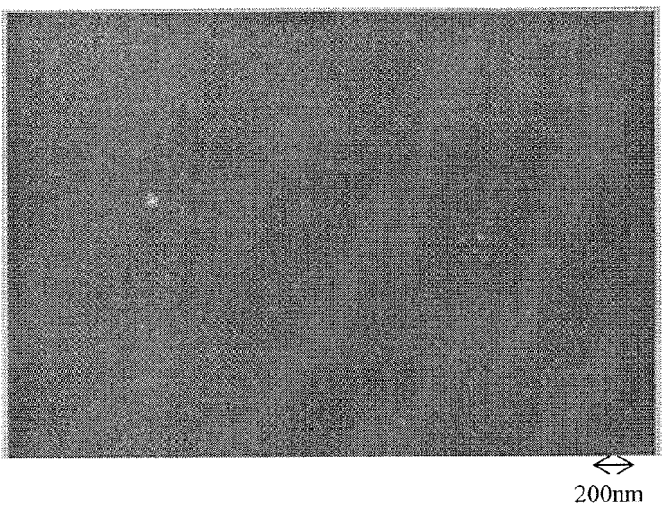
Figure 10:
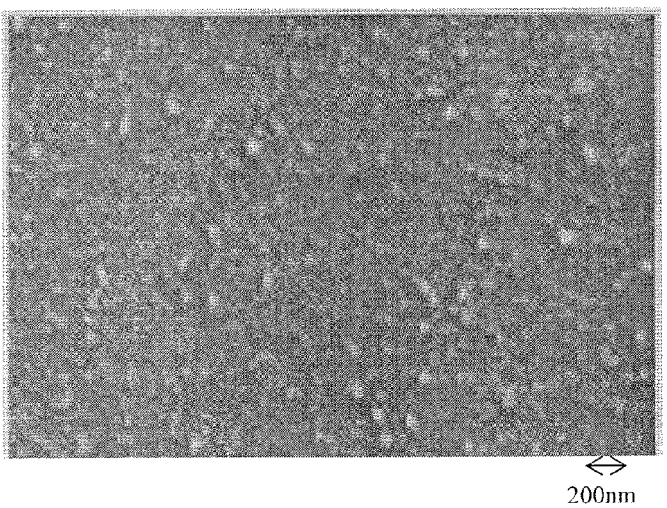

FIG. 10(a) is an SEM image of a vertical alignment film surface after an alignment sustaining layer is formed. FIG. 10(b) is an SEM image of a horizontal alignment film surface before an alignment sustaining layer is formed. FIG. 10(c) is an SEM image of a horizontal alignment film surface after an alignment sustaining layer is formed.

It can be seen from FIG. 10(a) that an alignment sustaining layer is formed in island shapes (discretely) on the surface of the vertical alignment film. On the other hand, it can be seen from FIGS. 10(b) and (c) that the alignment sustaining layer formed on the surface of the horizontal alignment film is denser in texture than the alignment sustaining layer on the surface of the vertical alignment film.

Thus, since an alignment sustaining layer which is dense in texture is formed on a horizontal alignment film, peeling of the alignment sustaining layer is likely to occur in large areas, so that scum from the alignment sustaining layer will be observed as floating light spots. On the other hand, even if an alignment sustaining layer on the surface of a vertical alignment film peels, the scum therefrom will have sizes on the submicron order, and thus will not be visually recognized as light spots.

Note that peeling of an alignment sustaining layer will occur regardless of the manner in which an alignment treatment is applied to the horizontal alignment film. The reason is that an alignment sustaining layer which is dense in texture will be formed on both a horizontal alignment film which has been subjected to a rubbing treatment and a horizontal alignment film (photoalignment film) which has been subjected to a photo-alignment treatment.

Figure 11:
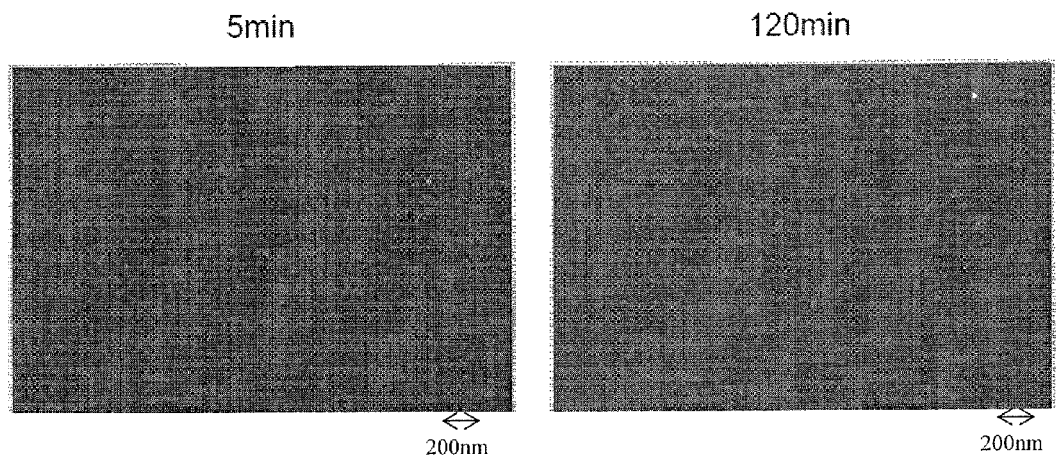
FIG. 11 SEM images of a horizontal alignment film surface after an alignment sustaining layer is formed, with respect to a horizontal alignment film (a polyimide-type horizontal alignment film which has been subjected to a rubbing treatment) of Sample 1.
Figure 12:
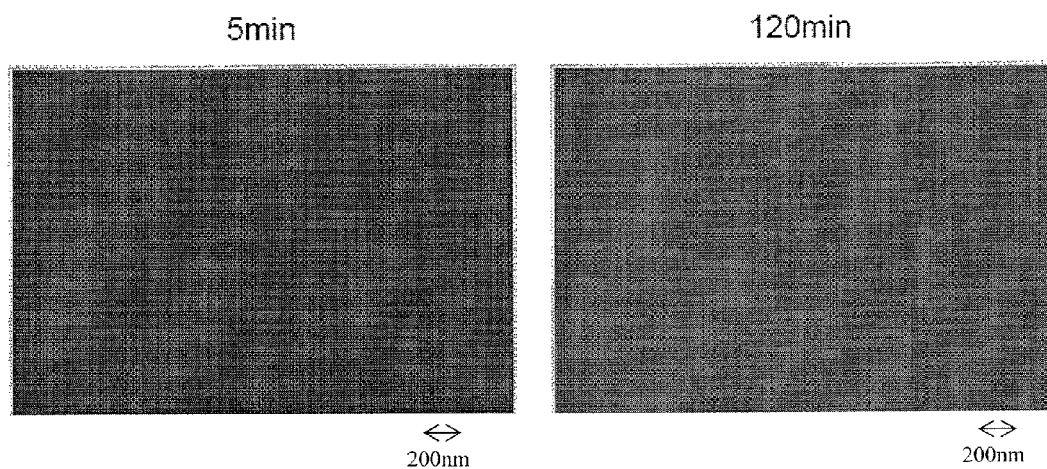
FIG. 12 SEM images of a horizontal alignment film surface after an alignment sustaining layer is formed, with respect to a horizontal alignment film (a polyimide-type horizontal alignment film which has been subjected to a rubbing treatment) of Sample 2.
Figure 13:
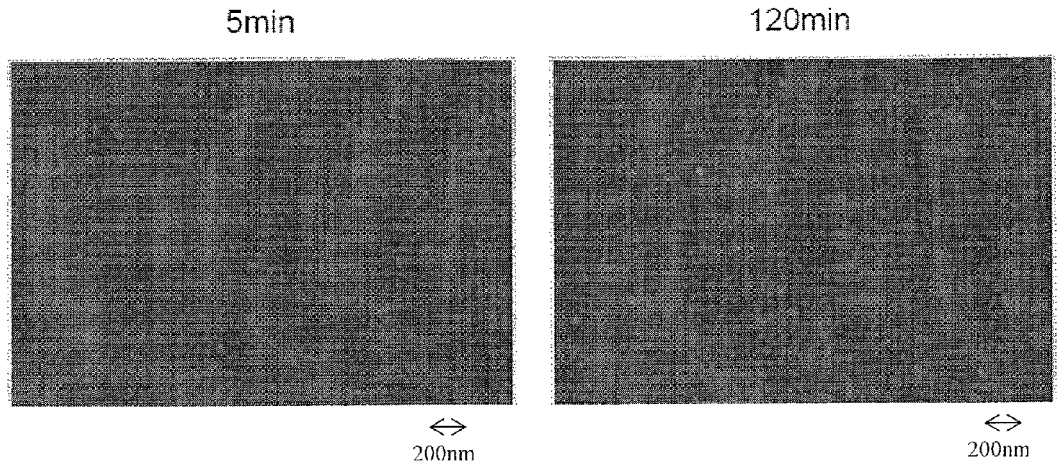
FIG. 13 SEM images of a horizontal alignment film surface after an alignment sustaining layer is formed, with respect to a horizontal alignment film (a polyimide-type horizontal alignment film of a decomposition type which has been subjected to a photo-alignment treatment) of Sample 3.

FIG. 11, FIG. 12, and FIG. 13 show SEM images, with respect to three horizontal alignment films (Samples 1, 2, and 3), of the horizontal alignment film surface after an alignment sustaining layer is formed. The Sample 1 shown in FIG. 11 and Sample 2 shown in FIG. 12 are polyimide-type horizontal alignment films which have been subjected to a rubbing treatment, whereas Sample 3 shown in FIG. 13 is a polyimide-type horizontal alignment film of a decomposition type which has been subjected to a photo-alignment treatment.

The baking conditions for forming a horizontal alignment film are 200° C. and 40 minutes for Samples 1 and 2, and 250° C. and 60 minutes for Sample 3. The photo-alignment treatment for Sample 3 was performed through light irradiation at 1.5 J/cm$^2$. For each Sample, the monomer which is used for forming the alignment sustaining layer is represented by formula (1) below, and the amount of monomer added to the liquid crystal material is 0.3 wt %.

[Formula 1]

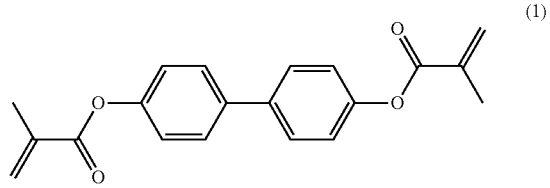

(1)

Each of FIG. 11, FIG. 12, and FIG. 13 shows two SEM images. In each figure, the left SEM image shows the case where the ultraviolet irradiation time when forming the alignment sustaining layer is 5 minutes, and the right SEM image shows the case where the ultraviolet irradiation time when forming the alignment sustaining layer is 120 minutes.

From FIG. 11, FIG. 12, and FIG. 13, it can be seen that an alignment sustaining layer which is dense in texture is formed on the surface of each of Samples 1, 2, and 3.

As mentioned earlier, when forming an alignment sustaining layer on a horizontal alignment film, a unique problem which has hitherto unrecognized occurs, that is, peeling of the alignment sustaining layer. The present invention has been made based on the above finding, which was obtained through a detailed study of this problem by the inventors.

Hereinafter, an embodiment of the present invention will be described with reference to the drawings. Note that the present invention is not to be limited to the following embodiment.

Figure 1:
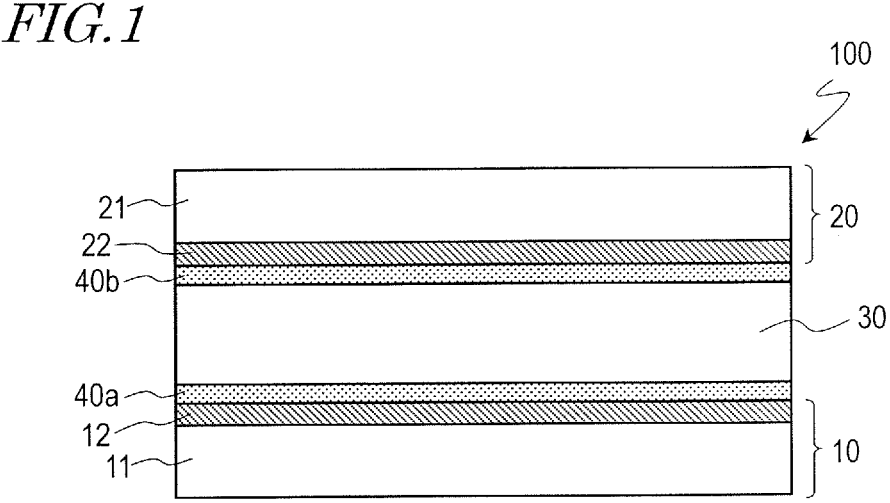
FIG. 1 A cross-sectional view schematically showing a liquid crystal display device 100 according to an embodiment of the present invention.

FIG. 1 shows a liquid crystal display device 100 according to the present embodiment. FIG. 1 is a cross-sectional view schematically showing the liquid crystal display device 100.

As shown in FIG. 1, the liquid crystal display device 100 includes an active matrix substrate 10, a counter substrate 20 opposing the active matrix substrate 10, and a liquid crystal layer 30 interposed therebetween. Although not shown in the figure, when the liquid crystal display device 100 is a transmission type, the liquid crystal display device 100 further includes a backlight (illuminator). The portion of the liquid crystal display device 100 excluding the backlight is referred to as a liquid crystal panel.

The active matrix substrate 10 includes a transparent substrate which is insulative (e.g., a glass substrate or plastic substrate) 11 and a horizontal alignment film 12 which is provided on the liquid crystal layer 30 side of the transparent substrate 11. Although not shown in the figure, the active matrix substrate 10 further include a thin film transistor (TFT) provided for each pixel, and a pixel electrode that is electrically connected to the thin film transistor.

The counter substrate 20 includes a transparent substrate which is insulative (e.g., a glass substrate or plastic substrate) 21 and a horizontal alignment film 22 provided on the liquid crystal layer 30 side of the transparent substrate 21. Although not shown in the figure, the counter substrate 20 further includes color filters and columnar spacers. The columnar spacers are for defining the thickness (cell gap) of the liquid crystal layer 30, whose apex abuts with the active matrix substrate 10.

Hereinafter, the horizontal alignment film 12 of the active matrix substrate 10 may be referred to as a first horizontal alignment film, and the horizontal alignment film of the counter substrate 20 as a second horizontal alignment film. Various known methods can be adopted for the alignment treatment for the horizontal alignment films 12 and 22; for example, the horizontal alignment films 12 and 22 may be subjected to a rubbing treatment or a photo-alignment treatment.

The display mode of the liquid crystal display device 100 may be any display mode in which the horizontal alignment films 12 and 22 are used, and there is no particular limitation. The display mode of the liquid crystal display device 100 may be a lateral electric field mode such as the IPS mode or the FFS mode, for example. In the case of a lateral electric field mode, not only pixel electrodes (which typically are in interdigitated form) but also a common electrode are provided on the active matrix substrate 10. Alternatively, the display mode of the liquid crystal display device 100 may be an FLC (ferroelectric liquid crystal) mode, a TN (Twisted Nematic) mode, or an STN (Super Twisted Nematic) mode.

The liquid crystal display device 100 further includes alignment sustaining layers 40a and 40b, which are provided between the first horizontal alignment film 12 and the liquid crystal layer 30, and between the second horizontal alignment film 22 and the liquid crystal layer 30. Hereinafter, the alignment sustaining layer 40a on the active matrix substrate 10 side (i.e., between the first horizontal alignment film 12 and the liquid crystal layer 30) may be referred to as the first alignment sustaining layer, whereas the alignment sustaining layer 40b on the counter substrate 20 side (i.e., between the second horizontal alignment film 22 and the liquid crystal layer 30) may be referred to as the second alignment sustaining layer. The alignment sustaining layers 40a and 40b contain a polymerization product of a photopolymerizable compound, and are formed by PSA technique. The photopolymerizable compound may be, for example, a photopolymerizable monomer or a photopolymerizable oligomer, and is typically a photopolymerizable monomer.

In the liquid crystal display device 100 of the present embodiment, the photopolymerizable compound for composing the alignment sustaining layers 40a and 40b contains an acrylate group or a methacrylate group, and the polymerization product in the alignment sustaining layers 40a and 40b contains an acrylate group or a methacrylate group as a residue. In the present embodiment, furthermore, the horizontal alignment films 12 and 22 also contain an acrylate group or a methacrylate group.

Therefore, the acrylate group or methacrylate group contained in the polymerization product in the first alignment sustaining layer 40a may become bonded to the acrylate group or methacrylate group contained in the first horizontal alignment film 12. Similarly, the acrylate group or methacrylate group contained in the polymerization product in the second alignment sustaining layer 40b may become bonded to the acrylate group or methacrylate group contained in the second horizontal alignment film 22. This improves adhesion of the alignment sustaining layers 40a and 40b with respect to the horizontal alignment films 12 and 22. Thus, peeling of the alignment sustaining layers 40a and 40b can be suppressed, and occurrence of floating light spots can be prevented.

In the technique disclosed in Patent Document 4, the bond which is formed between the polymerization initiating functional group in the vertical alignment film and the alignment sustaining layer is monovalent. On the other hand, in the present embodiment, a divalent bond is formed between the acrylate group or methacrylate group contained in the polymerization product in the alignment sustaining layers 40a and 40b and the acrylate group or methacrylate group contained in the horizontal alignment films 12 and 22. That is, a stronger bond is created, whereby adhesion of the alignment sustaining layers 40a and 40b is enhanced. Moreover, according to the present embodiment, it is not necessary for the horizontal alignment films 12 and 22 to contain a polymerization initiating functional group. Thus, the alignment property of liquid crystal molecules will not be degraded by the presence of a polymerization initiating functional group to cause a lowered contrast ratio.

As the method of allowing an acrylate group or a methacrylate group to be contained in the horizontal alignment films 12 and 22, two methods which are described below are applicable, for example.

A first method is a method where a polyfunctional acrylate monomer or a polyfunctional methacrylate monomer is added as an additive to an alignment film material for composing the horizontal alignment films 12 and 22. In this case, when baking the horizontal alignment films 12 and 22, the monomer being added as an additive is partially polymerized to form an oligomer or polymer, these being entangled with the polymer contributory to horizontal alignment property. Furthermore, other than physical entanglement, if the polymer contributory to horizontal alignment property and the monomer respectively contain functional groups which undergo chemical bonding with heat, e.g., an amino group and an epoxy group, or an amino group and a carboxyl group, the polymer contributory to horizontal alignment property and the oligomer and polymer originating from the monomer being added as an additive will assume a chemically bonded state through baking of the horizontal alignment films 12 and 22. In the oligomer and polymer formed at this point, an acrylate group or methacrylate group exists as a residue.

In other words, when the first method is adopted, the horizontal alignment films 12 and 22 contain: a polymer contributory to horizontal alignment property; and an oligomer or polymer which is formed through polymerization of a polyfunctional acrylate monomer or a polyfunctional methacrylate monomer, the oligomer or polymer containing an acrylate group or a methacrylate group as a residue. The acrylate group or methacrylate group contained in the oligomer or polymer which is formed through polymerization of the monomer being added as an additive becomes bonded to the acrylate group or methacrylate group contained in the polymerization product in the alignment sustaining layers 40a and 40b, whereby peeling of the alignment sustaining layers 40a and 40b is suppressed.

A second method is a method where an acrylate group or a methacrylate group is introduced in the polymer composing the horizontal alignment films 12 and 22 itself. In this case, the horizontal alignment films 12 and 22 contain a polymer contributory to horizontal alignment property, this polymer itself containing an acrylate group or a methacrylate group. The acrylate group or methacrylate group contained in the polymer contributory to horizontal alignment property becomes bonded to the acrylate group or methacrylate group contained in the polymerization product in the alignment sustaining layers 40a and 40b, whereby peeling of the alignment sustaining layers 40a and 40b is suppressed.

In the present specification, the horizontal alignment films 12 and 22 formed by the first method will be referred to as an "addition-type" horizontal alignment film. The horizontal alignment films 12 and 22 formed by the second method will in the present specification be referred to as a "direct introduction-type" horizontal alignment film.

Figure 2:
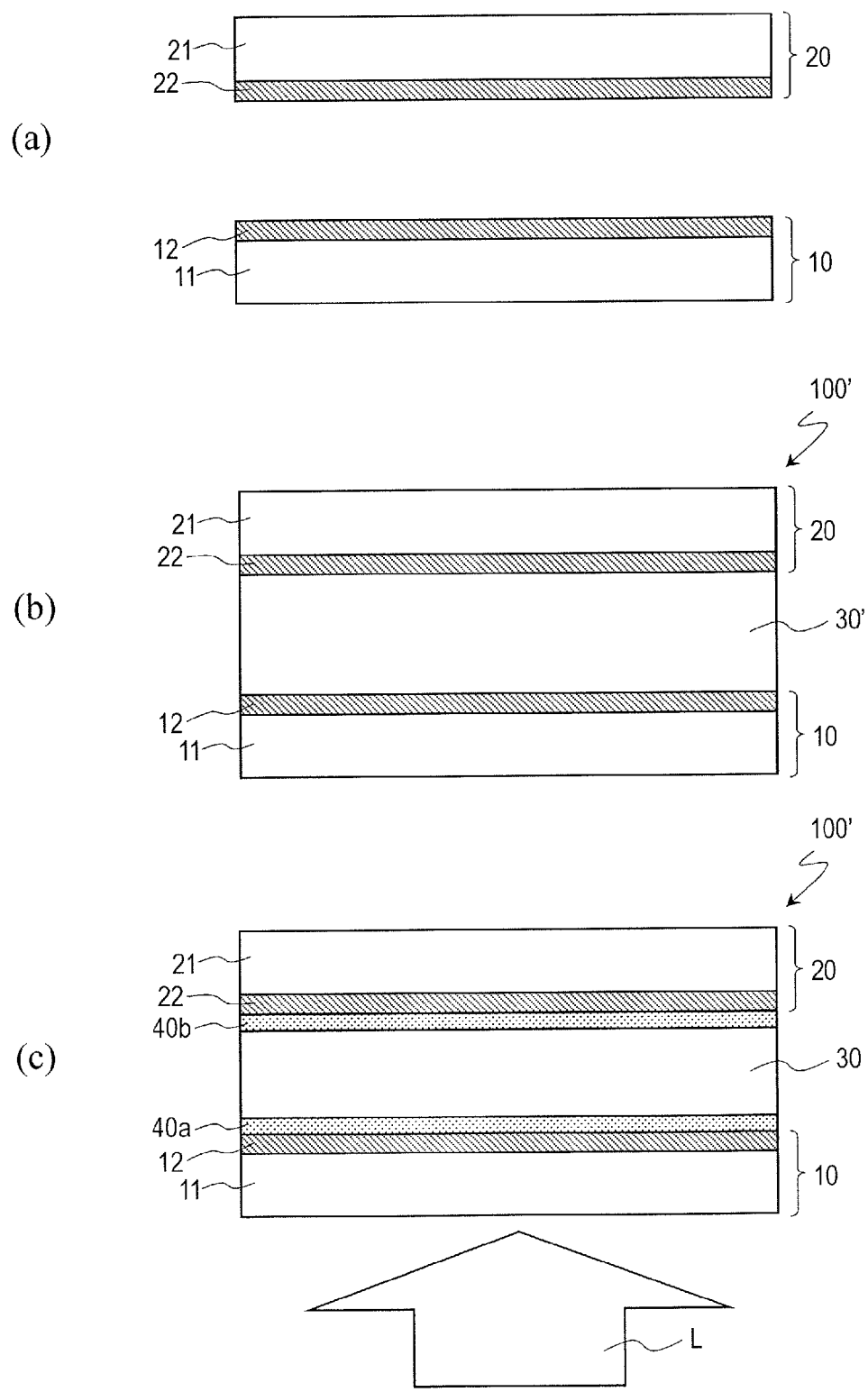
FIG. 2(a) to (c) are step-by-step cross-sectional views for describing a method of producing the liquid crystal display device 100.

With reference to FIG. 2, a method of producing the liquid crystal display device 100 will be described.

First, as shown in FIG. 2(a), the active matrix substrate 10 having the first horizontal alignment film 12 and the counter substrate 20 having the second horizontal alignment film 22 are provided. As has already been described, the first horizontal alignment film 12 and the second horizontal alignment film 22 contain an acrylate group or a methacrylate group. This step includes a step of providing an alignment film material for composing the horizontal alignment films 12 and 22. The step of providing the alignment film material will be described in detail later. The alignment film material provided (which typically is a solution containing a solid content for composing the alignment film and a solvent in which the solid content is dissolved; also referred to as an alignment film solution) is applied on a transparent substrate 11 having thin film transistors, pixel electrodes, and the like formed thereon, and thereafter a heat treatment is conducted, whereby the first horizontal alignment film 12 is obtained.

Moreover, the alignment film material provided is applied on a transparent substrate 21 having color filters and the like formed thereon, and thereafter a heat treatment is conducted, whereby the second horizontal alignment film 22 is obtained. Typically, the heat treatment is conducted in two times at different temperatures. The first heat treatment (called a prebake) removes a large part of the solvent, thereby forming the alignment film, whereas a second heat treatment (which is conducted at a higher temperature than that of the first heat treatment; called a full-bake) stabilizes the alignment film.

Moreover, the step of providing the active matrix substrate 10 and the counter substrate 20 also includes a step of performing an alignment treatment for the horizontal alignment films 12 and 22. For example, with a rubbing treatment or a photo-alignment treatment, the pretilt direction(s) to be defined by the horizontal alignment films 12 and 22 can be set to a predetermined direction(s). For example, the photo-alignment treatment can be conducted via irradiation of polarized ultraviolet.

The active matrix substrate 10 and the counter substrate 20 without the horizontal alignment films 12 and 22 being formed thereon can be formed by known techniques. For example, in the case where the liquid crystal display device 100 performs displaying in a lateral electric field mode, various structures which are known as the electrode structures under the IPS mode and the FFS mode can be adopted as the electrode structures on the active matrix substrate 10.

Next, as shown in FIG. 2(b), a liquid crystal panel 100' having a liquid crystal material 30' being sealed in between the active matrix substrate 10 and the counter substrate 20 is produced. While the active matrix substrate 10 and the counter substrate 20 are attached together, the liquid crystal material 30' may be injected between the active matrix substrate 10 and the counter substrate 20 by vacuum injection technique. Alternatively, after the liquid crystal material 30' is added dropwise upon one of the active matrix substrate 10 and the counter substrate 20 by one drop filling technique (ODF), the active matrix substrate 10 and the counter substrate 20 may be attached together.

The liquid crystal material 30' which is sealed in at this step has a photopolymerizable compound mixed therein. This photopolymerizable compound contains an acrylate group or a methacrylate group. Specifically, the photopolymerizable compound is a photopolymerizable monomer or a photopolymerizable oligomer. Typically, the photopolymerizable compound is a photopolymerizable monomer, which is preferably polyfunctional. As the photopolymerizable monomer, for example, those represented by the general formula P1-A1-(Z1-A2)n-P2 (where P1 and P2 are, each independently, an acrylate group or a methacrylate group; A1 and A2 are, each independently, a 1,4-phenylene or naphthalene-2,6-diyl group; Z1 is a —COO— group, an —COO— group, or a single bond; and n is 0, 1, or 2) can be suitably used. The photopolymerizable monomer represented by the general formula above contains one or more ring structures or condensed ring structures and an acrylate group and/or methacrylate group as a polymerization functional group bonded to this ring structure or condensed ring structure. In the case where a photopolymerizable monomer represented by the general formula above, it is preferable that Z1 is a single bond, and that n is 0 or 1.

Thereafter, as shown in FIG. 2(c), the liquid crystal panel 100' is irradiated with light L, thereby allowing the photopolymerizable monomer to polymerize to form the alignment sustaining layers 40a and 40b upon the horizontal alignment films 12 and 22. Ultraviolet is typically used as the light L with which the liquid crystal panel 100' is irradiated. For example, ultraviolet irradiation at about 3 J/cm$^2$ is conducted by using black light. At this step, it is not necessary to apply a voltage across the liquid crystal material 30' (liquid crystal layer 30). In other words, at the step of forming the alignment sustaining layers 40a and 40b, radiation of light L may be conducted without applying any voltage in the liquid crystal panel 100'.

Now, the step of providing the alignment film material is described. In the case of forming addition-type horizontal alignment films 12 and 22, the alignment film material contains a polymer contributory to horizontal alignment property or a precursor thereof, and a polyfunctional acrylate monomer or a polyfunctional methacrylate monomer. As the polymer contributory to horizontal alignment property and a precursor thereof, various known stuff can be used, e.g., polyimide, polysiloxane, polyvinyl compounds, or precursors thereof.

As the acrylate monomer or methacrylate monomer to be added to the alignment film material, various monomers containing an acrylate group or a methacrylate group can be used. For example, the monomers which were described as example materials for the alignment sustaining layers 40a and 40b may be used. However, unlike the material of the alignment sustaining layers 40a and 40b, the monomer to be added to the alignment film material does not need to directly contribute in terms of alignment regulating force for the liquid crystal molecules, and therefore does not need to include any rigid portion (ring structure or condensed ring structure). For this reason, those which are different from the material of the alignment sustaining layers 40a and 40b may be used as the monomer to be added to the alignment film material, e.g., ethylene glycol dimethacrylate, triethylene glycol dimethacrylate, dipropylene glycol diacrylate, trimethylolpropane triacrylate, or di-trimethylolpropane tetraacrylate. Specifically, it is preferable that the acrylate monomer or methacrylate monomer to be added to the alignment film material is difunctional to hexafunctional.

The molecular weight of the acrylate monomer or methacrylate monomer to be added to the alignment film material is preferably not less than 80 and not more than 600, and more preferably, not less than 150 and not more than 400. If the molecular weight is too small, it will vaporize through the heat treatment (bake) when the horizontal alignment films 12 and 22 are formed, so that the desired effect (effect of preventing peeling of the alignment sustaining layers 40a and 40b) may not be adequately obtained. If the molecular weight is too large, the density of the acrylate group or methacrylate group in the horizontal alignment films 12 and 22 will lower, so that the desired effect may also not be adequately obtained.

The amount of acrylate monomer or methacrylate monomer added to the alignment film material is preferably not less than 0.1 wt % and not more than 50 wt %, and more preferably, not less than 1 wt % and not more than 10 wt %, based on the solid content. If the added amount is too small, the desired effect (effect of preventing peeling of the alignment sustaining layers 40a and 40b) may not be adequately obtained. If the added amount is too large, the density of the alignment group in the horizontal alignment films 12 and (i.e., a functional group contributory to horizontal alignment property) will lower, so that the horizontal alignment property may be deteriorated and the contrast ratio may lower.

On the other hand, when forming direct introduction-type horizontal alignment films 12 and 22, the alignment film material contains a polymer contributory to horizontal alignment property or a precursor thereof, the polymer or a precursor thereof containing an acrylate group or a methacrylate group. Generic polymers that are known as horizontal alignment films have a main chain, e.g., polyimide-type, polysiloxane-type, or polyvinyl-type, as well as side chains containing a functional group contributory to horizontal alignment property (e.g., a cinnamate group). In the polymer or a precursor thereof used herein, some of the side chains contain an acrylate group or a methacrylate group. In other words, what is obtained by introducing an acrylate group or methacrylate group in some of the side chains of various polymers that are known as horizontal alignment films, and precursors thereof, can be broadly used.

However, the introduced amount of the acrylate group or methacrylate group is such that, in the case of a photoalignment film, for example, the copolymerization ratio between the repetition units containing a photofunctional group and the repetition units containing an acrylate group or a methacrylate group is preferably not less than 1000:1 and not more than 1:1, and more preferably not less than 100:1 and not more than 10:1. If the introduced amount is too small, the desired effect (effect of preventing peeling of the alignment sustaining layers 40a and 40b) may not be adequately obtained. If the introduced amount is too large, the density of the alignment group in the horizontal alignment films 12 and 22 (i.e., a functional group contributory to horizontal alignment property) will lower, so that the horizontal alignment property may be deteriorated and the contrast ratio may lower.

The liquid crystal display device 100 of the present embodiment can be produced in the above-described manner.

Next, preferable constructions for the liquid crystal display device 100 and example constructions in which the present embodiment possesses large significance when used will be described.

Figure 3:
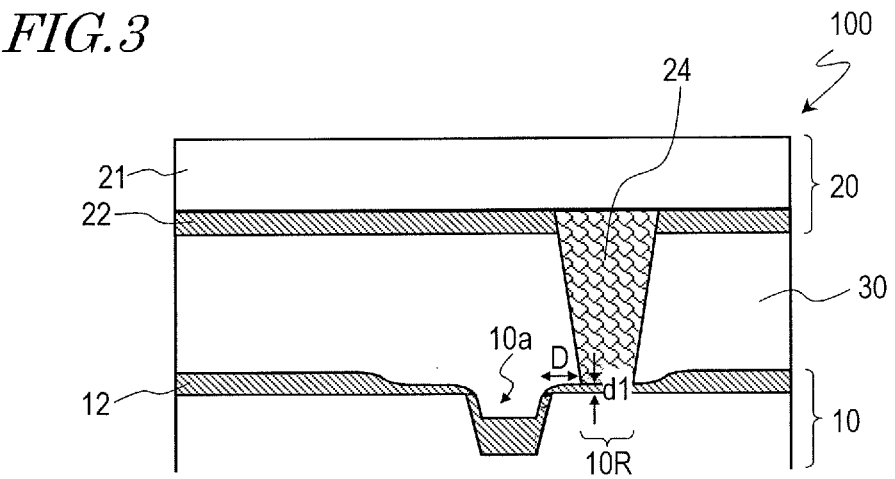
FIG. 3 A cross-sectional view showing an exemplary construction for the liquid crystal display device 100.

In the construction shown in FIG. 3, the counter substrate 20 of the liquid crystal display device 100 includes a columnar spacer 24 that defines the thickness (cell gap) of the liquid crystal layer 30. The columnar spacer 24 is typically made of a photo-sensitive resin. Note that the alignment sustaining layers 40a and 40b are omitted from FIG. 3.

In the construction shown in FIG. 3, the active matrix substrate 10 has a recess 10a near a region abutting the columnar spacer 24 (hereinafter referred to as an "abutting region") 10R. If such a recess 10a exists near the abutting region 10R (typically so that the distance D from the abutting region 10R to the recess 10a is 50 μm or less), the alignment film material will flow into the recess 10a when the horizontal alignment film 12 is formed (i.e., when the alignment film material is applied), thus resulting in a reduced thickness d1 of the horizontal alignment film 12 near the recess 10a, i.e., in the abutting region 10R. When the thickness d1 of the horizontal alignment film 12 of the abutting region 10R is thus small, the alignment sustaining layer 40a is likely to peel when the columnar spacer 24 vibrates in the lateral direction, unless the construction of the present embodiment is adopted. Therefore, it can be said that the present embodiment possesses large significance when used in a construction where the recess 10a exists near the abutting region 10R.

Moreover, it has been found through a study of the inventors that, if the construction of the present embodiment is not adopted (i.e., if the horizontal alignment film 12 does not contain an acrylate group or a methacrylate group), peeling of the alignment sustaining layer 40a is prominent when the thickness d1 of the horizontal alignment film 12 in the abutting region 10R is 50 nm or less. Thus, it can be said that the present embodiment has a large effect in a construction where the thickness d1 of the horizontal alignment film 12 in the abutting region 10R is 50 nm or less.

Figure 4:
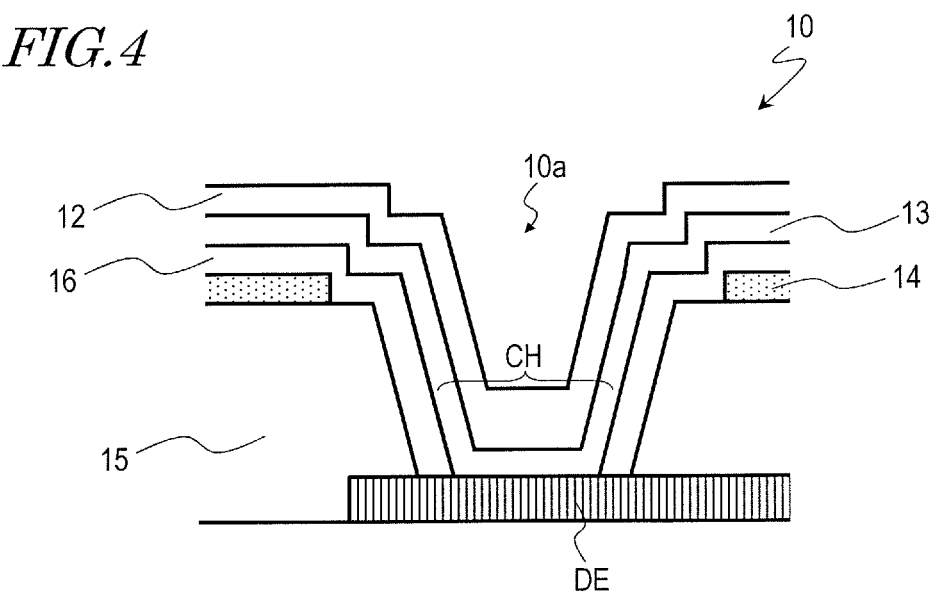
FIG. 4 A cross-sectional view showing an example of a recess 10a in an active matrix substrate 10 of the liquid crystal display device 100.
Figure 5:
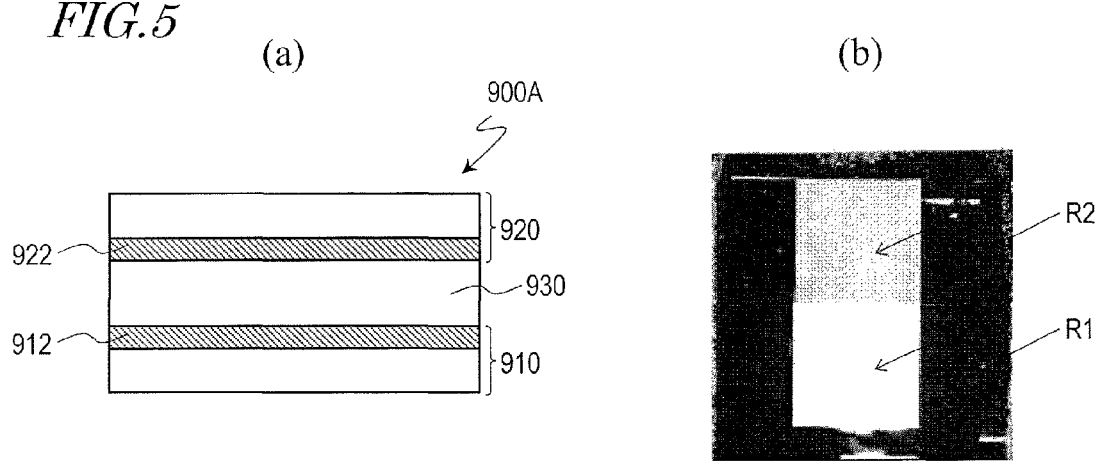
FIG. 5(a) is a diagram showing a cross-sectional structure of a liquid crystal display device 900A of an IPS mode; and (b) is a photograph showing a result of conducting an evaluation test concerning the anti-image sticking property of the liquid crystal display device 900A shown in (a).
Figure 6:
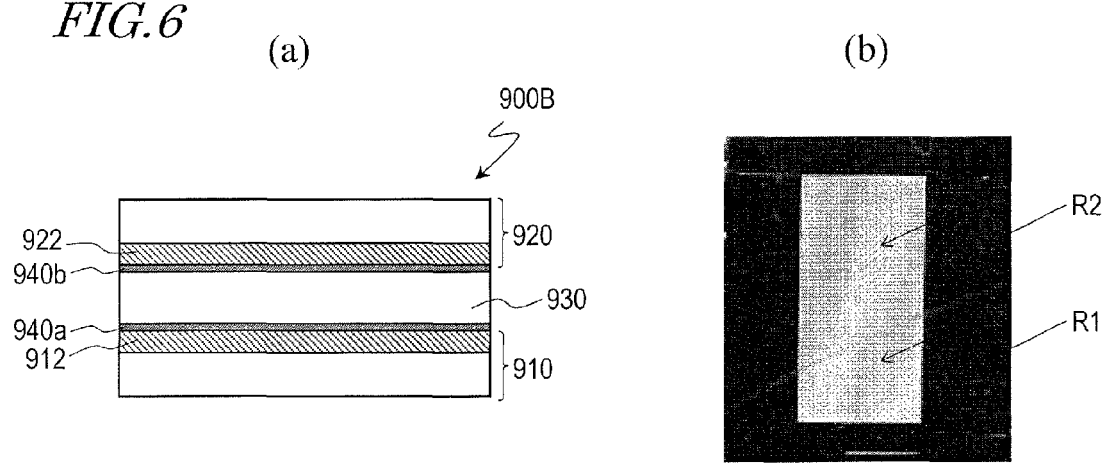
FIG. 6(a) is a diagram showing a cross-sectional structure of a liquid crystal display device 900B of an IPS mode; and (b) is a photograph showing a result of conducting an evaluation test concerning the anti-image sticking property of the liquid crystal display device 900B shown in (a).
Figure 7:
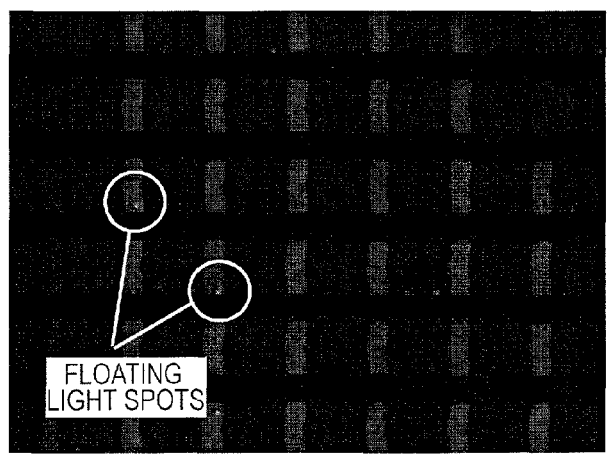
FIG. 7 A photograph showing a liquid crystal panel in which floating light spots have occurred.
Figure 8:
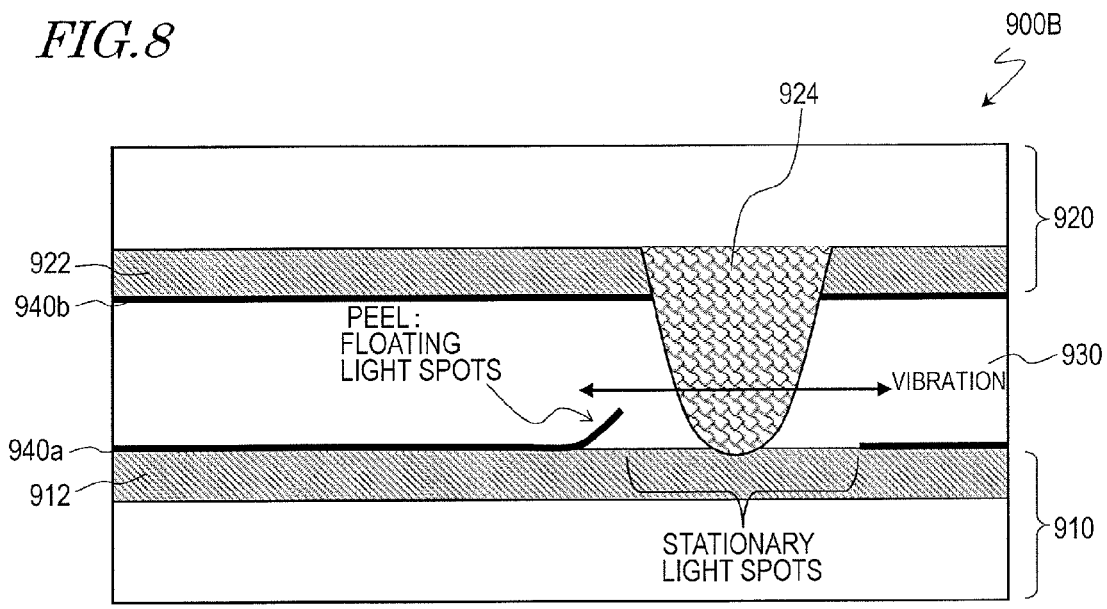
FIG. 8 A diagram schematically showing the principle by which floating light spots occur.
Figure 9:
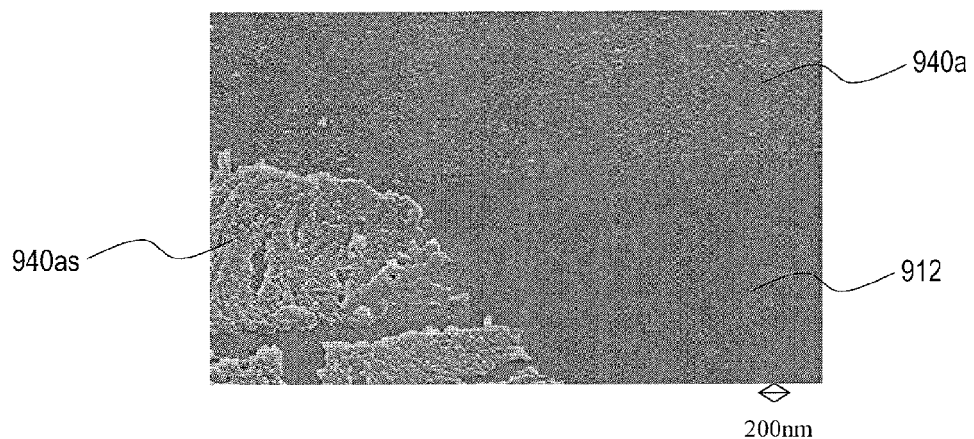
FIG. 9 An SEM image of a portion in which peeling of an alignment sustaining layer 940a has actually occurred in the liquid crystal display device 900B.

A specific example of the aforementioned recess 10a is shown in FIG. 4. In the example shown in FIG. 4, an active matrix substrate 10 includes a pixel electrode 13 and a common electrode 14. The pixel electrode 13 is electrically connected to a drain electrode DE of a TFT. An interlayer insulating layer 15 is formed so as to cover the drain electrode DE and the like, such that the common electrode 14 is provided on the interlayer insulating layer 15. A dielectric layer 16 is formed so as to cover the common electrode 14, such that the pixel electrode 13 is provided on the dielectric layer 16. A contact hole CH is formed in the interlayer insulating layer 15 and the dielectric layer 16, such that the drain electrode DE of the TFT and the pixel electrode 13 are connected within the contact hole CH. Thus, in the example shown in FIG. 4, the contact hole CH for electrically connecting the TFT and the pixel electrode 13 is provided in the recess 10a. The contact hole CH typically has a depth of 1 μm or more.

Moreover, as the transparent substrate 11 of the active matrix substrate 10 and the transparent substrate 21 of the counter substrate 20 become thinner, the transparent substrates 21 and 22 will have greater flexure, thus making the columnar spacer 24 more likely to vibrate and the alignment sustaining layer 40a more likely to peel. According to a study of the inventors, peeling of the alignment sustaining layer 40a when not adopting the construction of the present embodiment was prominent when the total of the thickness of the transparent substrate 11 of the active matrix substrate 10 and the thickness of the transparent substrate 21 of the counter substrate 20 was 1 mm or less. Therefore, the present embodiment possesses large significance in a construction where the total of the thickness of the transparent substrate 11 of the active matrix substrate 10 and the thickness of the transparent substrate 21 of the counter substrate 20 is 1 mm or less.

Furthermore, the present embodiment has a large effect in a construction where the liquid crystal display device 100 functions also as a touch screen panel. The reason is that, in such a construction, the liquid crystal panel is pressed for every input, with which the columnar spacer 24 will vibrate in the lateral direction. The touch screen panel may be a touch screen panel of various known types, e.g., a resistive type or a capacitance type.

Moreover, from the standpoint of further suppressing peeling of the alignment sustaining layers 40a and 40b, it is preferable that the horizontal alignment films and 22 are photoalignment films. If the horizontal alignment films 12 and 22 are photoalignment films, the photoalignment films will become excited when the alignment sustaining layers 40a and 40b are formed through photopolymerization, whereby movements of excitation energy and radicals to the photopolymerizable monomer will occur. While this provides an improved reactivity in the formation of the alignment sustaining layers 40a and 40b, it also promotes bonding between the acrylate group or methacrylate group contained in the horizontal alignment films 12 and 22 and the acrylate group or methacrylate group contained in the polymerization product in the alignment sustaining layers 40a and 40b.

As the photoalignment films, various types of photoalignment films containing a photoreactive functional group can be used, e.g., an isomerization type that undergoes a photoisomerization reaction, a dimerization type that undergoes a photodimerization reaction, and a decomposition type that undergoes a photodecomposition reaction. As the photoreactive functional group, a cinnamate group is suitably used, for example.

Moreover, from the standpoint of further suppressing peeling of the alignment sustaining layers 40a and 40b, it is preferable that the liquid crystal layer 30 contains liquid crystal molecules containing an alkenyl group. When the liquid crystal molecules contain an alkenyl group, progress of the reaction for forming the alignment sustaining layers 40a and 40b can be promoted, and also the bonding between the acrylate group or methacrylate group contained in the horizontal alignment films 12 and 22 and the acrylate group or methacrylate group contained in the polymerization product in the alignment sustaining layers 40a and 40b can be promoted. Presumably, this is primarily because the multiple bonds of an alkenyl group that is contained in the liquid crystal molecules themselves may be activated by light, and secondarily because it can become carriers that are capable of exchange of activation energy, radicals, and so on.

Moreover, as the remaining amount of the photopolymerizable compound in the liquid crystal layer 30 (i.e., the rate of the amount of the photopolymerizable compound remaining after the alignment sustaining layers 40a and 40b are formed relative to the amount added to the liquid crystal material 30) decreases, the degree of polymerization of the polymerization product in the alignment sustaining layers 40a and 40b increases, thus enhancing the hardness of the alignment sustaining layers 40a and 40b and making it more difficult for the alignment sustaining layers 40a and 40b to peel. Specifically, the remaining amount of the photopolymerizable compound in the liquid crystal layer 30 is preferably 30% or less, and more preferably 20% or less. Therefore, the step of forming the alignment sustaining layers 40a and 40b (the step shown in FIG. 2(c)) is conducted preferably so that the remaining amount of the photopolymerizable compound in the liquid crystal material 30' is 30% or less, and more preferably 20% or less.

Now, results of actually prototyping the liquid crystal display device 100 of the present embodiment as Examples 1 to 4 and verifying the effects thereof will be described. In the verification, liquid crystal display devices whose horizontal alignment films contained neither an acrylate group nor a methacrylate group were also actually prototyped as Comparative Examples 1 to 5, and the number of floating light spots were compared between Examples 1 to 4 and Comparative Examples 1 to 5.

Comparative Example 1

First, a TFT substrate having a 10-inch display region size and a thickness of 0.7 mm was provided as an active matrix substrate. This TFT substrate had electrode structures for the FFS mode, with interdigitated pixel electrodes at a line/space (L/S) of 3 µm/5 µm. As TFTs (thin film transistors), this TFT substrate had oxide conductor TFTs having a semiconductor layer composed of an In—Ga—Zn—O-type semiconductor (IGZO-type semiconductor). As a counter substrate, a color filter substrate having color filters was provided.

Next, a polyvinyl cinnamate solution as an alignment film material was applied on each of the TFT substrate and the color filter substrate by spin coating technique. The polyvinyl cinnamate solution was adjusted by dissolving 3 wt % of polyvinyl cinnamate in a solvent in which equal amounts of N-methyl-2-pyrrolidone and ethylene glycol monobutyl ether were mixed. After the application of the polyvinyl cinnamate solution, a prebake was conducted at 100° C. for 1 minute, followed by a full-bake at 220° C. for 40 minutes with nitrogen purging.

The horizontal alignment film over the pixel electrode, which is the uppermost layer in the display region of the TFT substrate, had a thickness of 75 nm. Each columnar spacer formed on the color filter substrate had a diameter of 12 µm in its lowermost portion. The height of the columnar spacers was set so that the liquid crystal layer in the display region had a thickness of 3.5 µm. Near a region of the TFT substrate abutting each columnar spacer, a contact hole existed for electrically connecting the pixel electrode and the TFT. Upon application of the alignment film material, the alignment film material would flow into that portion (recess), so that the horizontal alignment film had a thickness of about 10 nm in the region abutting each columnar spacer.

Next, as a photo-alignment treatment, the horizontal alignment films on both the TFT substrate and the color filter substrate were irradiated with linearly polarized ultraviolet having a wavelength of 313 nm. The ultraviolet irradiation was performed from the substrate normal direction, with an irradiation dose of 5 J/cm$^2$. The direction that the slits in the pixel electrodes made of ITO constituted an angle of 10° with the polarization direction of the ultraviolet.

Next, by using a dispenser, a seal pattern of a heat/visible-light dual sealing material (World Rock manufactured by Kyoritsu Chemical & Co., Ltd.) was drawn on the TFT substrate. Thereafter, a liquid crystal material was added dropwise on the color filter substrate. As the liquid crystal material, what was obtained by adding 5 wt % liquid crystalline molecule trans-4-propyl-4'-vinyl-1,1'-bicyclohexane to MLC-6610 manufactured by Merck KGaA, and further adding 0.3 wt % biphenyl-4,4'-diylbis(2-methyl acrylate) as a polymerizerable additive (photopolymerizable monomer) was used.

Next, the TFT substrate and the color filter substrate were attached together in such a manner that the ultraviolet radiated onto the horizontal alignment films on the respective substrates had identical polarization directions. Next, while pressurizing the two substrates now attached together at 0.5 kgf/cm$^2$, the sealing material was photocured by using a super-high pressure UV lamp (USH-500D manufactured by USHIO INC.). Within the ultraviolet emitted from the super-high pressure UV lamp, any wavelength of 380 nm or below was completely cut off with a filter. Thereafter, while continuing pressurization, heating was conducted at 130° C. for 40 minutes, thus thermosetting the sealing material and carrying out a realignment treatment for the liquid crystal. As a result, a liquid crystal panel for the FFS mode was obtained in which liquid crystal molecules were uniaxially aligned in a direction orthogonal to the polarization direction of the ultraviolet with which the horizontal alignment films were irradiated. All of the above steps were conducted under a yellow fluorescent lamp, thus preventing the liquid crystal panel from exposure to ultraviolet from any fluorescent lamp.

Next, the liquid crystal panel was heated at 130° C. for 40 minutes, and the liquid crystal panel was subjected to a careful static elimination treatment. Thereafter, this liquid crystal panel was irradiated with ultraviolet at an irradiation dose of 1.5 J/cm$^2$ by using a black light (FHF32BLB manufactured by TOSHIBA CORPORATION), thus conducting a PS (Polymer sustained) treatment. As a result, polymerization of biphenyl-4,4'-diylbis(2-methyl acrylate) progressed, whereby alignment sustaining layers were formed between the horizontal alignment films and the liquid crystal layer. Thus, a liquid crystal panel without any alignment unevenness was produced.

This liquid crystal panel was allowed to have free falls from a height of 1 m onto a piece of foamed styrol. At this time, the liquid crystal panel was allowed to fall in such a manner that the display surface of the liquid crystal panel and the principal face of the piece of foamed styrol were parallel. Thirty falls were repetitively performed.

Thereafter, a central region (having an area of 1 cm$^2$) of the liquid crystal panel was observed with a polarizing microscope in order to measure the number of floating light spots, which read approximately 200.

Example 1

A liquid crystal panel of Example 1 was produced in a similar manner to Comparative Example 1, except that a difunctional acrylate monomer was added to the alignment film material to result in an added amount of 5 wt % relative to the solid content. As the difunctional acrylate monomer, diethylene glycol dimethacrylate as expressed by formula (2) below was used.

[Formula 2]

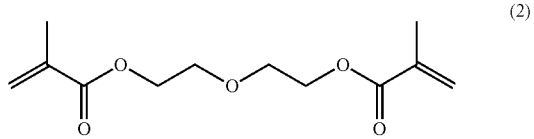

(2)

After conducting a drop test similar to that in Comparative Example 1, a central region (having an area of 1 cm$^2$) of the liquid crystal panel was observed with a polarizing microscope in order to measure the number of floating light spots, which read approximately 20.

Thus, occurrence of floating light spots was considerably suppressed in Example 1, as compared to Comparative Example 1. This is because, when the horizontal alignment films 12 and 22 were baked, the acrylate monomer added to the alignment film material was polymerized to become an acrylate polymer (or acrylate oligomer), which was entangled with the polymer contributory to horizontal alignment property, and in the subsequent PS treatment, the alignment sustaining layers (acrylate polymer layers) which were formed at the interfaces between the horizontal alignment films 12 and 22 and the liquid crystal layer 30 chemically bonded to the acrylate polymer in the horizontal alignment films, thereby enhancing the adhesion of the alignment sustaining layer with the horizontal alignment films.

Comparative Example 2

Except that the solid content of the alignment film material was a polyimide-type material not for use with photoalignment films, and that a rubbing treatment in an anti-parallel manner was conducted as the alignment treatment instead of a photo-alignment treatment through polarized light irradiation, a liquid crystal panel was produced in a similar manner to Comparative Example 1, and was subjected to a drop test.

Thereafter, a central region (having an area of 1 cm$^2$) of the liquid crystal panel was observed with a polarizing microscope in order to measure the number of floating light spots, which read approximately 50.

Example 2

A liquid crystal panel of Example 2 was produced in a similar manner to Comparative Example 2, except that a difunctional acrylate monomer was added to the alignment film material to result in an added amount of 5 wt % relative to the solid content. As the difunctional acrylate monomer, diethylene glycol dimethacrylate was used similarly to Example 1.

After conducting a drop test similar to that in Comparative Example 2, a central region (having an area of 1 cm$^2$) of the liquid crystal panel was observed with a polarizing microscope in order to measure the number of floating light spots, which read approximately 20.

Thus, in Example 2, occurrence of floating light spots was suppressed as compared to Comparative Example 2. As this indicates, the effect of preventing peeling of the alignment sustaining layers 40a and 40b can be obtained even when the horizontal alignment films 12 and 22 are not photoalignment films.

Comparative Example 3

Except that the solid content of the alignment film material was a polyimide-type material containing a cyclobutane backbone, and that polarized ultraviolet with a wavelength of 254 nm was radiated at an irradiation dose of 1.5 J/cm$^2$ as an alignment treatment, a liquid crystal panel was produced in a similar manner to Comparative Example 1, and was subjected to a drop test. The reason for the different photo-alignment treatment conditions between Comparative Example 1 and Comparative Example 3 is that the photoalignment films in Comparative Example 1 are of an isomerization/dimerization type, whereas the photoalignment films in Comparative Example 3 are of a decomposition type.

Thereafter, a central region (having an area of 1 cm$^2$) of the liquid crystal panel was observed with a polarizing microscope in order to measure the number of floating light spots, which read approximately 50.

Example 3

A liquid crystal panel of Example 3 was produced in a similar manner to Comparative Example 3, except that a difunctional acrylate monomer was added to the alignment film material to result in an added amount of 5 wt % relative to the solid content. As the difunctional acrylate monomer, diethylene glycol dimethacrylate was used similarly to Example 1.

After conducting a drop test similar to that in Comparative Example 3, a central region (having an area of 1 cm$^2$) of the liquid crystal panel was observed with a polarizing microscope in order to measure the number of floating light spots, which read approximately 20.

Thus, in Example 3, occurrence of floating light spots was suppressed as compared to Comparative Example 3. As this indicates, the effect of preventing peeling of the alignment sustaining layers 40a and 40b can be obtained even when the horizontal alignment films 12 and 22 are decomposition-type photoalignment films.

Comparative Example 4

Except that the solid content of the alignment film material was a polyimide-type material containing a cinnamate group, and that polarized ultraviolet with a wavelength of 313 nm was radiated at an irradiation dose of 60 mJ/cm$^2$ as an alignment treatment, a liquid crystal panel was produced in a similar manner to Comparative Example 1, and was subjected to a drop test. The photoalignment films of Comparative Example 4 were of an isomerization/dimerization type.

Thereafter, a central region (having an area of 1 cm$^2$) of the liquid crystal panel was observed with a polarizing microscope in order to measure the number of floating light spots, which read approximately 200.

Example 4

A liquid crystal panel of Example 4 was produced in a similar manner to Comparative Example 4, except that a difunctional acrylate monomer was added to the alignment film material to result in an added amount of 5 wt % relative to the solid content. As the difunctional acrylate monomer, diethylene glycol dimethacrylate was used similarly to Example 1.

After conducting a drop test similar to that in Comparative Example 4, a central region (having an area of 1 cm$^2$) of the liquid crystal panel was observed with a polarizing microscope in order to measure the number of floating light spots, which read approximately 20.

Thus, in Example 4, occurrence of floating light spots was suppressed as compared to Comparative Example 4. As this indicates, the effect of preventing peeling of the alignment sustaining layers 40a and 40b can be obtained not only when the main chain of the polymer contributory to horizontal alignment property is polyimide as in Example 1, but also when it is polyvinyl as in Example 4. In other words, the effect of preventing peeling of the alignment sustaining layers 40a and 40b does not depend on the kind of main chain of the polymer contributory to horizontal alignment property.

Comparative Example 5

After producing a liquid crystal panel in a similar manner to Comparative Example 4, a thinning process was performed through etching with hydrofluoric acid, so that a total of the thicknesses of the transparent substrates in the TFT substrate and the color filter substrate was 1.4 mm to 0.8 mm.

Thereafter, after conducting a drop test similar to that in Comparative Example 4, a central region (having an area of 1 cm$^2$) of the liquid crystal panel was observed with a polarizing microscope in order to measure the number of floating light spots, which read approximately 500. Thus, in Comparative Example 5, occurrence of floating light spots was even more prominent than in Comparative Example 4. This is presumably because thinner transparent substrates would lead to greater flexure, thus increasing the vibration of the columnar spacers.

INDUSTRIAL APPLICABILITY

According to an embodiment of the present invention, there is provided a liquid crystal display device in which peeling of an alignment sustaining layer formed on a horizontal alignment film is suppressed, as well as a method of producing the same. In a liquid crystal display device according to an embodiment of the present invention, peeling of the alignment sustaining layer is suppressed, whereby occurrence of floating light spots is suppressed and high-quality displaying becomes possible.

REFERENCE SIGNS LIST

10 active matrix substrate
10a recess
10R abutting region
11, 21 transparent substrate
12, 22 horizontal alignment film
13 pixel electrode
14 common electrode
15 interlayer insulating layer
16 dielectric layer
20 counter substrate
24 columnar spacer
30 liquid crystal layer
40a, 40b alignment sustaining layer
100 liquid crystal display device
DE drain electrode
CH contact hole

The invention claimed is:

1. A liquid crystal display device comprising:
   a first substrate and a second substrate opposing each other;
   a liquid crystal layer between the first substrate and the second substrate, at least one of the first substrate and the second substrate including a horizontal alignment film on a side adjacent to the liquid crystal layer that aligns liquid crystal molecules of the liquid crystal layer horizontally in the absence of an applied voltage; and
   an alignment sustaining layer between the horizontal alignment film and the liquid crystal layer, the alignment sustaining layer including a polymerization product of a photopolymerizable compound, wherein,
   the photopolymerizable compound includes an acrylate group or a methacrylate group;
   the polymerization product in the alignment sustaining layer includes an acrylate group or a methacrylate group as a residue;
   the horizontal alignment film includes an acrylate group or a methacrylate group;
   the acrylate group or methacrylate group contained in the polymerization product in the alignment sustaining layer is bonded to the acrylate group or methacrylate group contained in the horizontal alignment film;
   the horizontal alignment film includes a polymer contributory to a horizontal alignment property, the polymer contributory to the horizontal alignment property including a side chain including an acrylate group or a methacrylate group.

2. The liquid crystal display device of claim 1, wherein the horizontal alignment film includes an oligomer or polymer which is a polymerization of a polyfunctional acrylate monomer or a polyfunctional methacrylate monomer, and
   the oligomer or polymer includes an acrylate group or a methacrylate group as a residue.

3. The liquid crystal display device of claim 1, wherein the photopolymerizable compound is polyfunctional.

4. The liquid crystal display device of claim 1, wherein, the second substrate includes a columnar spacer that defines a thickness of the liquid crystal layer.

5. The liquid crystal display device of claim 4, wherein the first substrate has a recess near a region abutting the columnar spacer.

6. The liquid crystal display device of claim 4, wherein the horizontal alignment film has a thickness of 50 nm or less in the region of the first substrate abutting the columnar spacer.

7. The liquid crystal display device of claim 4, wherein,
the first substrate and the second substrate each includes an insulative transparent substrate; and
a total of thicknesses of the transparent substrates in the first substrate and the second substrate is 1 mm or less.

8. The liquid crystal display device of claim 1 functioning as a touch screen panel.

9. The liquid crystal display device of claim 1, wherein the horizontal alignment film is a photoalignment film.

10. The liquid crystal display device of claim 1, wherein the liquid crystal layer includes liquid crystal molecules including an alkenyl group.

11. The liquid crystal display device of claim 1, wherein a remaining amount of the photopolymerizable compound in the liquid crystal layer is 30% or less.

* * * * *